United States Patent
Takebe et al.

[11] Patent Number: 6,096,380
[45] Date of Patent: Aug. 1, 2000

[54] METHOD FOR WATER REPELLENT COATING AND COATING APPARATUS FOR THE SAME

[75] Inventors: Yasuo Takebe, Katano; Norihisa Mino, Nara, both of Japan

[73] Assignee: Matsushita Electric Industrial Co., Ltd., Osaka, Japan

[21] Appl. No.: 09/185,100

[22] Filed: Nov. 3, 1998

[30] Foreign Application Priority Data

Nov. 4, 1997 [JP] Japan ..................................... 9-301868

[51] Int. Cl.[7] ........................................................ B05D 1/28
[52] U.S. Cl. ............................................ 427/429; 118/257
[58] Field of Search .................................... 427/429, 211;
118/257, 62, 63, 76, 77

[56] References Cited

U.S. PATENT DOCUMENTS

| | | | |
|---|---|---|---|
| 2,176,393 | 10/1939 | Edge | 118/257 |
| 2,868,162 | 1/1959 | Knain | 118/257 |
| 3,231,418 | 1/1966 | Muggleton | 427/211 |
| 3,377,598 | 4/1968 | Borman | 118/257 |
| 4,268,263 | 5/1981 | Meredith | 8/149 |
| 4,828,884 | 5/1989 | Miller | 427/248 |
| 5,073,195 | 12/1991 | Cuthbert et al. | 106/2 |
| 5,466,292 | 11/1995 | Kustermann | 118/257 |
| 5,506,005 | 4/1996 | Paloviita | 427/428 |

FOREIGN PATENT DOCUMENTS 7-218362  8/1995  Japan .

*Primary Examiner*—Shrive Beck
*Assistant Examiner*—Michael Barr
*Attorney, Agent, or Firm*—McDermott, Will & Emery

[57] ABSTRACT

It is provided a water repellent coating method and apparatus which permits efficient coating either plain or curved surfaces of articles. There is disclosed in the present specification a water repellent coating method comprises the steps of: (a) loading to a carrier in the form of endless belt a coating solution containing at least a water repellent, (b) bringing said carrier into contact with an article to transfer said coating solution on the material, and (c) forming a water repellent film on said article.

11 Claims, 8 Drawing Sheets

METHOD FOR WATER REPELLENT COATING AND COATING APPARATUS FOR THE SAME

BACKGROUND OF THE INVENTION

The present invention relates to a novel coating method and an apparatus for applying a coating solution on an article to be coated and forming a water repellent film thereon.

A number of coating methods to form a film on an article to be coated are known in the prior art. There are, for example, the dipping process and the roll coating process.

The dipping process involves dipping the article in a coating solution and then pulling it up. This dipping process is not economical, because it requires the dipping solution in a quantity large enough to submerge the whole article. For dipping a large article, a large amount of coating solution has to be prepared. Another drawback to the dipping process is that a large vessel for the coating solution is required for coating a large article, which makes the coating equipment voluminous. Still another problem with the dipping process is that it is difficult to limit the part to be coated to a specific part of the article since the whole article will be coated.

For this reason, the roll coating process is used especially when the coating solution is applied to an article with a large area or to a specific part of the article.

In the conventional roll coating process, the coating solution is first loaded on a cylindrical roll and then, the article is brought into contact with the roll to transfer the coating solution thereon.

The problem with the roll coating process is that the curved surface of the roll often fails to fit on a curved surface of the article to be coated and to transfer the coating solution, because the coating is effected by bringing the roll into contact with the article. To overcome this problem, the roll may be made of a flexible or elastic material so as to fit on the curved surface of the article. But the contact pressure between the roll and the article is different from area to area, and a uniform coating can hardly be achieved. In addition, since the coating roll is usually installed horizontally, the way of moving the article in the coating operation is limited.

SUMMARY OF THE INVENTION

The present invention addresses those problems encountered with the prior art.

It is an object of the present invention to provide a new coating process which replaces the roll coating process and is suitable for coating on a large area or a specific part of an article to be coated.

It is another object of the present invention to provide a coating process and an apparatus which permits efficient coating irrespective of the form of the article to be coated.

The present invention is concerned with a water repellent coating process which includes the steps of:

(a) loading to a carrier in the form of endless belt a coating solution containing at least a water repellent, (b) bringing the carrier into contact with an article to be coated to transfer the coating solution thereon, and (c) forming a water repellent film on the article.

It is desirable that the method includes a step (d) of washing the carrier.

The article may have a curved surface and a uniform water repellent film may preferably be formed on the curved surfaces.

The preferred water repellent is a silane compound having at least one group selected from the group consisting of an alkyl group, a fluoroalkyl group and an aryl group; a thiol compound having at least one group selected from the group consisting of an alkyl group and an aryl group; or a triazine thiol compound.

It is also preferable that the carrier is made with rubber, a fabric or a nonwoven fabric.

In the step (b), when the carrier with a coating solution loaded thereon is brought into contact with the article, the coating solution is preferably applied on the article by differentiating the speed of the carrier in relation to that of the article to rub the carrier against the article.

Also, in the step (b), it is preferable to bring the carrier into contact with the article by pressing the carrier from behind onto the article.

In this case, the carrier is preferably pressed onto the article by using a cylindrical roll provided behind the carrier.

It is also desirable to press the carrier onto the article by means of plural cylindrical rolls independently mounted behind the carrier.

Also it is preferable to press the carrier onto the article by jetting a gas through a nozzle provided behind the carrier.

In the step (a), meanwhile, it is desirable to load the coating solution to the carrier by dipping the carrier in the coating solution.

Also, in the step (a), it is desirable to load the coating solution to the carrier by spraying.

Again in the step (a), it is preferable to load the coating solution to the carrier by dropping the solution on the contact area between the carrier and a pair of cylindrical rolls placed in contact with the carrier.

It is desired that the foregoing method includes a step (e) of controlling an amount of the loaded coating solution by passing the carrier through between the plural rolls after loading the coating solution thereon in the step (a).

Also, it is desirable that the step (b) includes a step of holding the article so that the surface to be coated of the article is approximately vertical and driving the carrier in a horizontal direction at a position where the carrier is brought into contact with the article.

The present invention is also concerned with a coating apparatus which comprises a vessel filled with a coating solution containing at least a water repellent, a carrier in the form of endless belt, a means for loading the coating solution to the carrier, a means for pressing the carrier to contact with the article and a means for supporting the carrier together with the pressing means.

In this regard, too, it is desirable that the water repellent is a silane compound having at least one group selected from the group consisting of an alkyl group, a fluoroalkyl group and an aryl group, a thiol compound having at least one group selected from the group consisting of an alkyl group and an aryl group, or a triazine thiol compound.

The pressing means preferably comprises a cylindrical roll provided behind the carrier.

The pressing means preferably comprises plural independent rolls provided behind the carrier.

It is also preferable that the pressing means comprise a gas jetting nozzle provided behind the carrier and a means for activating the gas jetting nozzle to jet gas.

The coating apparatus preferably has a means for washing the carrier after the carrier being brought into contact with the article.

It is also preferable that there is provided an air shielding means for preventing the coating solution and the carrier from coming in contact with outside air.

DESCRIPTION OF THE PREFERRED EMBODIMENTS

Figure 1:
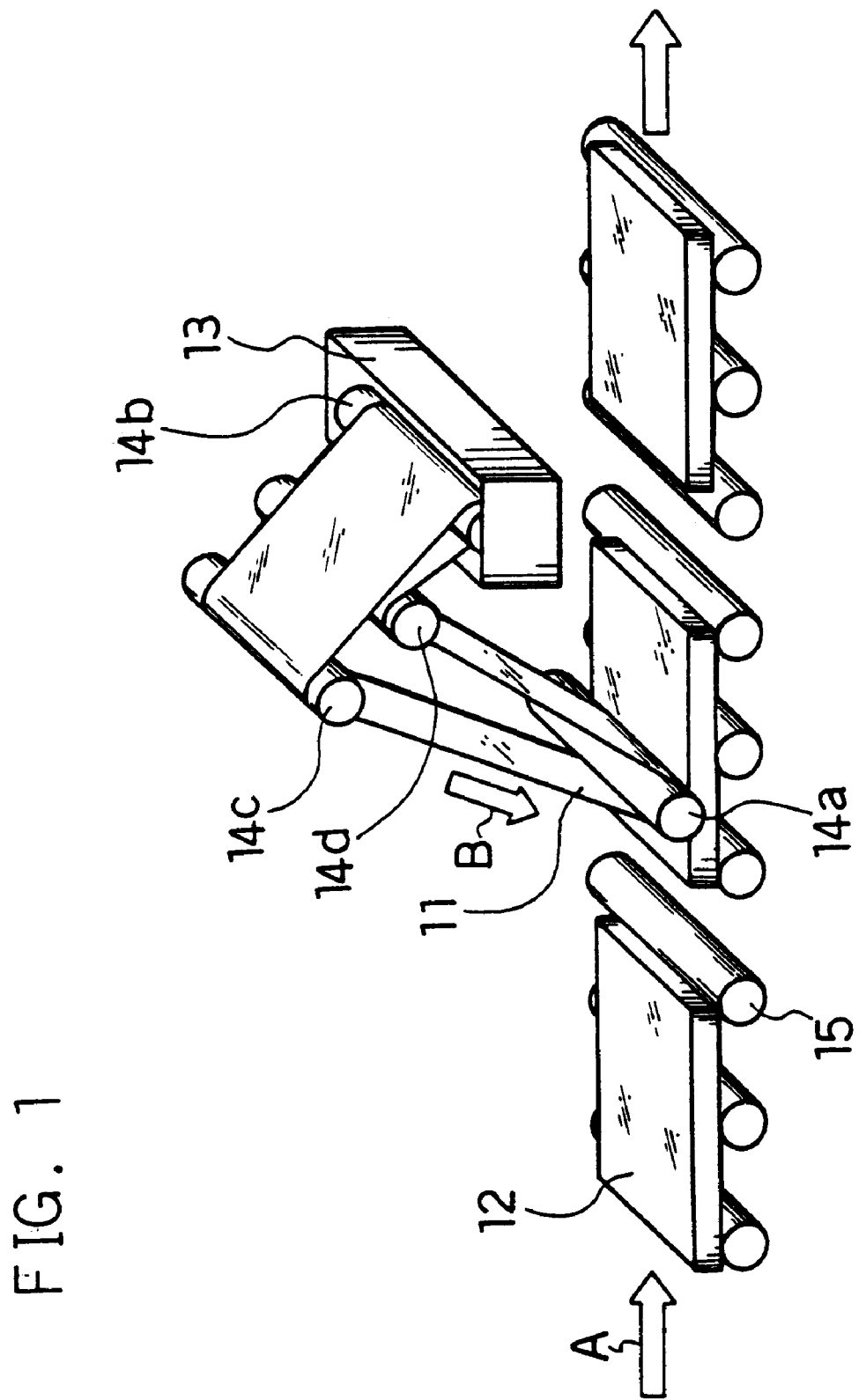
FIG. 1 is a perspective view schematically showing the arrangement of the coating apparatus in the first example of the present invention.

The coating process of the present invention comprises (a) loading to a carrier in the form of endless belt a coating solution containing at least a water repellent, (b) bringing the carrier into contact with an article to be coated to put the coating solution thereon, and (c) forming a water repellent film on the article.

In the present specification, the word "repellent" means the quality or capacity of forming a contact angle to water of 60 to 180°.

In the coating operation, the thickness of the film must be controlled to a desired thickness. To control the thickness of the film, it is necessary to strictly control the amount of the coating solution to apply.

In the present invention, to control the amount of the coating solution, the coating solution is first loaded onto the carrier in the form of endless belt and then applied to the article. The belt carrier requires to be capable of temporarily holding the coating solution and transporting the same onto the article. The carrier also must be sufficiently resistant to the coating solution and must not affect the solution adversely.

The carrier, which meets those requirements, is in the form of a loop belt, i.e. in the form of an endless belt. The carrier may be made with a fabric or a nonwoven fabric. As the material suitable for the carrier, there are, for example, natural fibers such as cotton and synthetic fibers such as polyester, nylon and rayon. The carrier also may be made of a rubber.

For coating a curved surface of the article, the carrier preferably is extendable and flexible enough to fit on the curved surface.

The carrier is made in the form of loop belt and, therefore, can carry the coating solution from the coating solution loading point to the surface (hereinafter referred to as "coating surface") of the article to be coated and the coating solution can be loaded to the carrier again after the carrier is brought into contact with the article. Namely, the coating can be carried out on a continuous basis. The position of the carrier can be changed by means of a guide roll while the coating solution is transported from the loading point to the coating surface. For example, the coating surface can be coated by holding the coating surface of the article nearly vertical and by bring a vertically positioned carrier into contact with the coating surface. The contact areas on the article and the carrier can be moved to a horizontal direction. Such a change in the position can hardly be made in the conventional roll coating process.

If the coating solution is rubbed on the article in the coating step (b), the coating solution may be easily applied on the coating surface. The rubbing of the solution onto the article also can remove dusts and stains on the coating surface and permits efficient coating.

Rubbing the solution against the article can be effected by putting the carrier and the article in a relative motion. In concrete, the carrier may be slipped on the article when the both are in contact with each other. It is also possible to move and slip the moving carrier on a specified area on the article. But it is more practical to put the carrier and the article in a relative motion at a contact rate, which is easier to control.

The coating solution is loaded on the carrier in the following three methods.

In the first method, the carrier is dipped in and then pulled up from the vessel filled with the coating solution. This method is the simplest and can do with a simple equipment. The coating solution has to be prepared in a large quantity enough to dip the carrier. The equipment has to hold a larger amount of the coating solution than that required for the coating. Another problem is that this method is not applicable for a coating solution which can degrade or evaporate when exposed to the air, because the carrier cannot be shielded from the air.

In the second method, the coating solution is sprayed over the article. This method is economical, because only the necessary amount of the coating solution has to be applied to the article. Another advantage of this method is that effects of the air on the coating solution such as degradation or evaporation of the solvent can be avoided, because the coating solution is supplied just before the application and the a previously used coating solution will not mix into a fresh supply.

In addition, the second method permits spraying and mixing two different kinds of reactive solutions on the article at the same time. This method is useful especially when applying a hydrolytic silane compound and water which cause a hydrolytic reaction once mixed. The degradation of the coating solution can be avoided by preparing the two components in separate reservoirs and spraying them separately on the article where the two components are mixed.

In the third method, the carrier is sandwiched between a pair of cylindrical rolls and the coating solution is dropped on the contact area between the carrier and one of the two rolls. This method, too, is cost-effective, because only the required amount of the solution for the coating is supplied as in the spraying method. Again, this method can avoid adverse effects of the air on the coating solution such as degradation or evaporation of the solvent.

The amount of the coating solution to load on the carrier has to be controlled to a suitable level. In the second method, the loading amount can be controlled by adjusting the spraying amount when the solution is sprayed in the form of mist. In the third method in which the coating solution is dropped onto the contact area between the carrier and the roll, the loading amount can be controlled by adjusting the dropping amount of the coating solution and the contact pressure between the carrier and the roll.

In the first method wherein the article is dipped in the vessel filled with the coating solution and pulling up, the loading amount of the coating solution can be controlled by passing the carrier through plural rolls and by controlling the contact pressure between the rolls and the carrier. This technique is applicable to the second and third loading methods.

In the step (b) of the coating process of the present invention, the carrier is brought into contact with the article to be coated. The preferred method for that is to press the carrier from behind onto the article.

The simplest way to press the carrier against the article is to thrust out the carrier to the article by means of a cylindrical roll provided behind the carrier. While this method is simple, the application is limited to a case wherein the coating surface is even or plain.

For coating a curved surface of an article, plural independent rolls or wheels are provided behind the carrier and thrust them out independently according to the form of the curved surface. That permits coating either on an uneven surface, i.e. a concave surface or convex surface.

Another possible way is to jet gas from a gas jetting nozzle provided behind the carrier to press the carrier against the article. Plural nozzles may be provided to fit the carrier to a curved coating surface of the article. For example, a high-pressure air from a compressor may be used as a means for activating the nozzle to jet gas. The optimum pressure of the gas to jet is different depending on such factors as the form of the nozzle to jet the gas, the area of the carrier and the coating rate and the like, but is preferably between 0.5 to 10 kgf/cm$^2$ in general.

The carrier may absorb the coating solution, and it can happen that too much solution is loaded. In that case, the thickness of the carrier should be properly adjusted so as to control the amount of the coating solution the carrier absorbs.

In the present invention, it is required the coating solution contains at least a water repellent.

As the water repellent, there are, for example, silane compounds, thiol compounds and triazine thiol compounds.

The water repellent may be selected according to the kind of article to be coated. For example, a silane compound or a silicone compound is preferably used for an article made of glass, and a thiol compound is preferably used for an article made of gold, silver or copper. A triazine thiol compound is preferably used for materials made of copper, zinc or nickel.

(1) Silane Compounds

On an article made of glass, the silane compound reacts with the hydroxyl group on the glass surface to form a siloxane bond. Thus, the silane compound forms a repellent film with a high durability. To form a siloxane bond, the silane compound must have a hydrolyzable group.

Therefore, the present invention uses a silane compound having a hydrolyzable group as well as at least a group selected from the group consisting of an alkyl group, a fluoroalkyl group and an aryl group. The suitable hydrolyzable groups are a halogen atom, an isocyanate group, an acetoxy group and an alkoxy group.

The examples of silane compounds are: $C_6H_{13}Si(OCH_3)_3$, $C_8H_{17}Si(OCH_3)_3$, $C_{10}H_{21}Si(OC_2H_5)_3$, $C_{12}H_{25}Si(OC_2H_5)_3$, $C_{18}H_{37}Si(OC_2H_5)_3$, $C_4F_9C_2H_4Si(OCH_3)_3$, $C_6F_{13}C_2H_4Si(OC_2H_5)_3$, $C_8F_{17}C_2H_4Si(OC_2H_5)_3$, $C_{10}F_{21}C_2H_4Si(OC_2H_5)_3$, $C_6H_{13}SiCl_3$, $C_8H_{17}SiCl_3$, $C_{10}H_{21}SiCl_3$, $C_{12}H_{25}SiCl_3$, $C_{18}H_{37}SiCl_3$, $C_4F_9C_2H_4SiCl_3$, $C_6F_{13}C_2H_4SiCl_3$, $C_8F_{17}C_2H_4SiCl_3$, $C_{10}F_{21}C_2H_4SiCl_3$, $C_6H_{13}Si(OCOCH_3)_3$, $C_8H_{17}Si(OCOCH_3)_3$, $C_{10}H_{21}Si(OCOCH_3)_3$, $C_{12}H_{25}Si(OCOCH_3)_3$, $C_{18}H_{37}Si(OCOCH_3)_3$, $C_4F_9C_2H_4Si(OCOCH_3)_3$, $C_6F_{13}C_2H_4Si(OCOCH_3)_3$, $C_8F_{17}C_2H_4Si(OCOCH_3)_3$, $C_{10}F_{21}C_2H_4Si(OCOCH_3)_3$, $C_6H_{13}Si(NCO)_3$, $C_8H_{17}Si(NCO)_3$, $C_{10}H_{21}Si(NCO)_3$, $C_{12}H_{25}Si(NCO)_3$, $C_{18}H_{37}Si(NCO)_3$, $C_4F_9C_2H_4Si(NCO)_3$, $C_6F_{13}C_2H_4Si(NCO)_3$, $C_8F_{17}C_2H_4Si(NCO)_3$, $C_{10}F_{21}C_2H_4Si(NCO)_3$, $C_6H_5Si(OCH_3)_3$, $CH_3C_6H_4Si(OCH_3)_3$, $C_6H_5SiCl_3$ and $CH_3C_6H_4SiCl_3$.

Among these compounds, the silane compounds having halogen atoms are preferable because of the reactivity. Preferable in the light of water repellency are the silane compounds having an alkyl group with not less than 6 carbon atoms or a fluoroalkyl group with not less than 4 carbon atoms, especially the silane compounds having a fluoroalkyl group with not less than 4 carbon atoms and an ethylene group.

Further preferable are silane compounds having an alkyl group with not less than 12 carbon atoms or a fluoroalkyl group with not less than 6 carbon atoms, and especially preferable are the silane compounds having a fluoroalkyl group with not less than 6 carbon atoms and an ethylene group.

In concrete, it is especially preferable to use the compound $C_8F_{17}C_2H_4SiCl_3$ for considerations of water repellency, reactivity and cost.

(2) Silicone Compounds

As the suitable silicone compounds, there is, for example, one having the general formula (1):

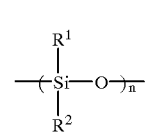

(1)

in which $R^1$ is an alkyl group having 1 to 8 carbon atoms and $R^2$ is a hydrogen atom, an alkyl group having 1 to 8 carbon atoms or an aryl group having 6 carbon atoms, and n is an integer of 5 to 900.

Among these silicone compounds, preferable in which $R^2$ is an aryl group. Preferable especially for coating an article made of glass are ones in which $R^2$ is a hydrogen atom, because the durability of a coated article may be enhanced by baking. In consideration of balancing the viscosity and the durability of the water repellent it is preferred that the viscosity is 10 to 1000 mm$^2$/s.

(3) Thiol Compounds

The thiol compounds suitable for use in the present invention are the thiol compounds having at least one group selected from the group consisting of an alkyl group and an aryl group. For considerations of reactivity, the alkyl group and the aryl group preferably contain a fluorine atom.

As concrete examples, the following can be cited: $C_6H_{13}SH$, $C_8H_{17}SH$, $C_{10}H_{21}SH$, $C_{12}H_{25}SH$, $C_{18}H_{37}SH$, $C_6H_5SH$, $CH_3C_6H_4SH$ and $C_6F_5SH$.

(4) Triazine Thiol Compounds

The suitable triazine thiol compounds include one having the general formula (2) or (3):

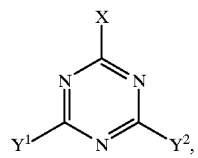
(2)

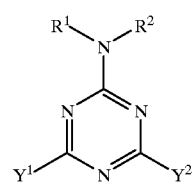
(3)

in which X represents H, SH or an alkyl group having 1 to 18 carbon atoms; $Y^1$ and $Y^2$ are SH or SNa; and $R^1$ and $R^2$ are H or an alkyl group having 1 to 8 carbon atoms.

If the water repellents are liquid, they can be used for coating as they are supplied without dilution. Water repellents in other forms than liquid or high-viscosity water repellents will improve workability if diluted and prepared with a suitable solvent into coating solution. The water repellents which can be used in coating as they are supplied can make an economical coating solution, too, if diluted with a suitable solvent.

While the solvent can be selected according to the kind of water repellent to apply and coating conditions, it is essential that the solvent dissolves the repellent but does not react therewith. If the hydrolyzable group thereof is a halogen atom, an isocyanate group or an acetoxy group, the water repellent reacts with proton-type solvents. For such repellents, therefore, non-proton-type solvents are used.

The non-proton-type solvents include hydrocarbons, silicone oil, ethers, ketones and the like. The concrete examples of the suitable non-proton-type solvents are hexane, hexadecane, toluene, xylene, tetralin, naphtha, straight-chain silicone, cyclic silicone, chloroform, ethylene glycol dimethyl ether, acetone, methyl ethyl ketone and the like.

In case where the hydrolyzable group is an alkoxy group, it is possible to use alcohols and glycols as well as those solvents mentioned above. The concrete examples include methanol, ethanol, propanol, butanol, ethylene glycol, methyl cellosolve and ethyl cellosolve and the like.

When the chlorosilane compound is used as water repellent, the following solvents are suitable: hydrocarbon solvents such as hexane, octane, hexadecane, toluene and the like; silicones such as cyclic polysiloxane, dimethyl silicone and the like; and halogen-type solvents such as chloroform, perfluorooctane and the like.

As the other water repellents, the following solvents as well as those given above are suitable: water, alcohols and ketones.

In a coating operation, it is rather common practice to remove dusts and stains on the article and polish and activate the coating surface with an abrasive prior to coating. The coating process according to the present invention eliminates the need of prior polishing; the polishing effect can be achieved by mixing an abrasive into the coating solution.

The abrasives are used in the form of fine particle in the coating process. They include cerium sulfate, silica, calcium carbonate, alumina and zeolite.

The articles to be coated are varied. They include glass, ceramics, earthenware, porcelain, pottery, metals such as gold, silver, copper and nickel, plastics and the like.

No restriction is imposed to the coating position of the article to be coated. Large coating articles such as car window glass can be coated efficiently if placed with the coating surface positioned approximately vertical and moved in that position with the carrier brought into contact therewith.

Upon contact with the atmosphere, some coating solutions will degrade. The moisture in the air causes a hydrolyzable reaction and degrades the coating solution which contains the hydrolyzable water repellents such as, for example, chlorosilane compounds and alkoxy silane compounds.

The possible degradation of such coating solutions can be avoided by shielding them from contacting with the outside air. That can be effected by enclosing the vessel with the coating solution and the carrier (for example, by means of an air shielding means) and by filling the inside with a moisture-free gas such as dry air or dry nitrogen gas.

The enclosure does not necessarily have to be air-tight. The passage of the article may be open. In such an arrangement, the outside air can be kept away by keeping the inside pressure slightly above the outside pressure.

In case there is fear that the coating solution will degrade on the carrier in the coating process or in case dusts and stains from the article will accumulate on the carrier, it is desirable to provide a means of washing the carrier after the contact.

As such washing means, there are one in which the washing fluid is sprayed on the carrier to wash away the dusts and stains together with degraded coating solution residues from the carrier and another in which the carrier is dipped in a vessel filled with the washing fluid to dissolve the dusts and stains degraded water repellent residues.

It is required that the washing fluid is capable of dissolving the water repellent and dissolving and removing the degraded water repellent residues, dusts and stains. It is desirable to use the same solvent as for the coating solution as washing fluid so as to preclude the possibility of the washing fluid reacting with and degrading the water repellent in the coating solution.

The present invention is concerned with a coating apparatus for the foregoing process, too.

The coating apparatus according to the present invention comprises a vessel with a coating solution having at least a water repellent, a carrier in the form of endless belt, a means for loading the coating solution to the carrier, a means for pressing the carrier to contact with the material and a means for supporting the carrier along with the pressing means.

The examples of the aforesaid pressing means include a cylindrical roll, plural independent rolls, a gas jetting nozzle and a means for jetting the gas through the gas jetting nozzle, all provided behind the carrier.

For the aforesaid reason, it is desirable to provide a means of washing the carrier as it departs from the article after coming in contact therewith. It is also preferable to provide a means of shielding the coating solution and the carrier from coming in contact with the outside air.

The air shielding means is not restrictive with regard to its form or the kind of material as long as that means can shield the coating apparatus from the outside air.

Hereinbelow, the present invention will be illustrated by the following examples to which it is understood the present invention is not limited.

EXAMPLE 1

FIG. 1 shows a coating apparatus in the present example of the present invention.

In FIG. 1, the reference number 11 indicates a carrier in the form of belt. The belt carrier 11 is supported on a number of rolls, i.e. a press 14a to press the carrier onto an article to be coated 12 which is carried on a conveying rolls 15 in the direction of arrow A, a roll 14b to dip the carrier in the coating solution filled in a vessel 13, and guide rolls 14c and 14d. The belt carrier 11 is moved in the direction of arrow B. The press 14a or the guide 14c is also a driving roll for the carrier 11.

The carrier 11 used in this example was made of polyester in the form of loop belt of 30 cm in width and 100 cm in circumference.

The coating solution was prepared by mixing ethyl cellosolve with 3% of octadecyl triethoxy silane (available from Chisso Corporation, Japan) as water repellent and 1% of acetic acid. The coating solution thus prepared was placed in the coating solution vessel 13 and was loaded on the carrier 11 which was rotated by driving the press 14a.

The article was a glass sheet of 30 cm×30 cm in size and 5 mm in thickness. The glass sheet was moved, with the press 14a pressing the carrier 11 onto the article glass on the conveying rolls 15. The conveying speed of the glass and the rotational speed of the carrier was set to 4 m/minute.

After coating, the glass was heated at 100° C. for 10 minutes and washed with water.

The contact angles of the glass before and after the coating and the washing are shown in Table 1. In the present example, the polyester fabric was used as the carrier. Identical results were obtained with carriers of fabrics of cotton and nylon and nonwoven fabrics of rayon.

In the present example, octadecyl triethoxy silane was used in the coating solution. Identical results were obtained with hexyl trimethoxy silane, dodecyl triethoxy silane, (tridecafluoro-1,1,2,2-tetrahydrooctyl) triethoxy silane, (heptadecafluoro-1,1,2,2-tetrahydrodecyl) triethoxy silane and phenyl triethoxy silane.

EXAMPLE 2

Figure 2:
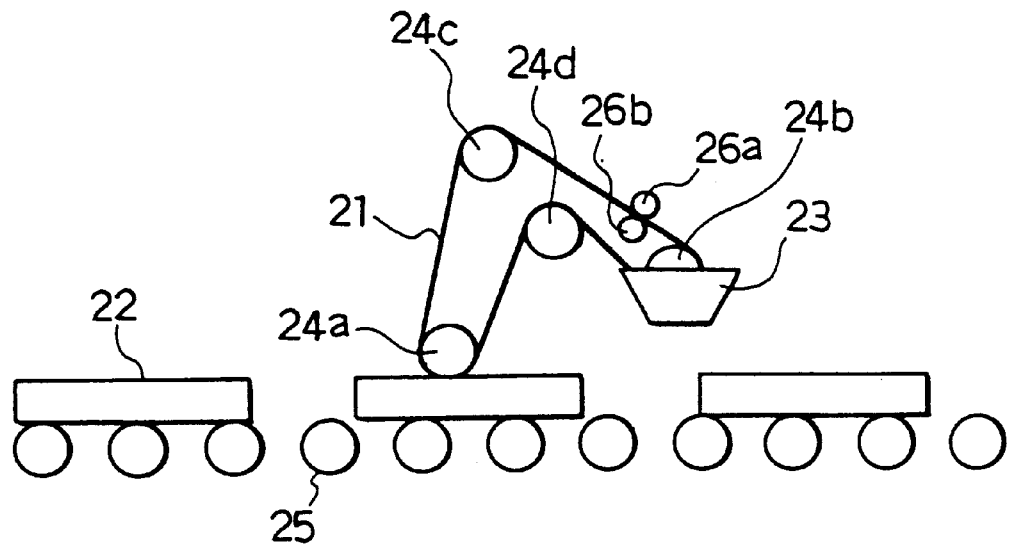
FIG. 2 is a side view schematically showing the arrangement of the coating apparatus in the second example of the present invention.

FIG. 2 shows a coating apparatus in the second example of the present invention.

In FIG. 2, the reference number 21 indicates a carrier in the form of belt. An article to be coated 22 is moved on conveying rolls 25 in the right direction in the drawing. The belt carrier 21 is supported on a number of rolls, i.e. a press roll 24a, a roll 24b provided within a coating solution vessel 23, and guide rolls 24c and 24d. The reference numbers 26a and 26b indicate rolls to control the amount of the coating solution loaded on the carrier 21 in the coating solution vessel 23 by passing the carrier 21 therethrough.

In the second example, the same carrier and the same article as in Example 1 were used.

The same coating solution as used in the first example was mixed with 5% of pulverized alumina as abrasive.

The coating solution thus prepared was placed in the coating solution vessel 23, and the carrier 21 was rotated. The carrier 21 was passed between controlling rolls 26a and 26b to squeeze out the excessive coating solution on the carrier 21.

As in the first example, the article 22 was moved on the conveying rolls 25 with the press roll 24a pressing the carrier 21 onto the article glass to effect the coating. The conveying speed of the glass was controlled to 4 m/minute and the rotational speed of the carrier was set to 5 m/minute. Thus, the coating solution loaded on the carrier was rubbed on the glass.

After coating, the glass was heated at 100° C. for 10 minutes and washed with water.

The contact angles of the glass before and after the coating are shown in Table 1.

EXAMPLE 3

Figure 3:
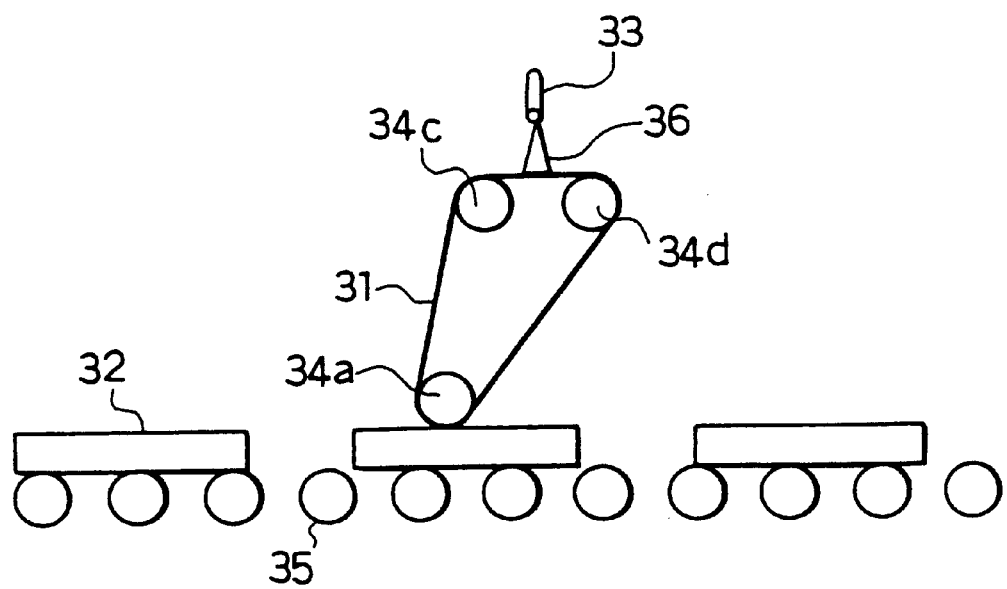
FIG. 3 is a side view schematically showing the arrangement of the coating apparatus in the third example of the present invention.

FIG. 3 shows a coating apparatus in the third example of the present invention.

A belt carrier 31 is supported on a number of rolls, i.e. press roll 34a, and guide rolls 34b and 34c. An article to be coated 32 is moved on conveying rolls 35. The carrier 31 is loaded with the coating solution jetted from a jetting nozzle 33 between rolls 34c and 34b. The reference number 36 indicates the coating solution being sprayed.

The carrier 31 used in Example 3 was made of polyester in the form of loop belt of 30 cm in width and 50 cm in circumference.

The coating solution was prepared by mixing xylene with 3% of methyl hydrodiene silicone (KF 99 available from Shin-Etsu Chemical Co., Ltd., Japan) as water repellent.

The article was a glass sheet of 30 cm×30 cm in size and 3 mm in thickness. The carrier was rotated with the coating solution sprayed uniformly in the form of mist over the carrier from a coating solution jetting nozzle 33. And as in Example 1, the glass sheet was moved, with the press roll 34a pressing the carrier 31 against the article glass on the conveying rolls 35.

After coating, the glass was heated at 100° C. for 10 minutes and washed.

The contact angles of the glass before and after the coating are shown in Table 1.

EXAMPLE 4

Figure 4:
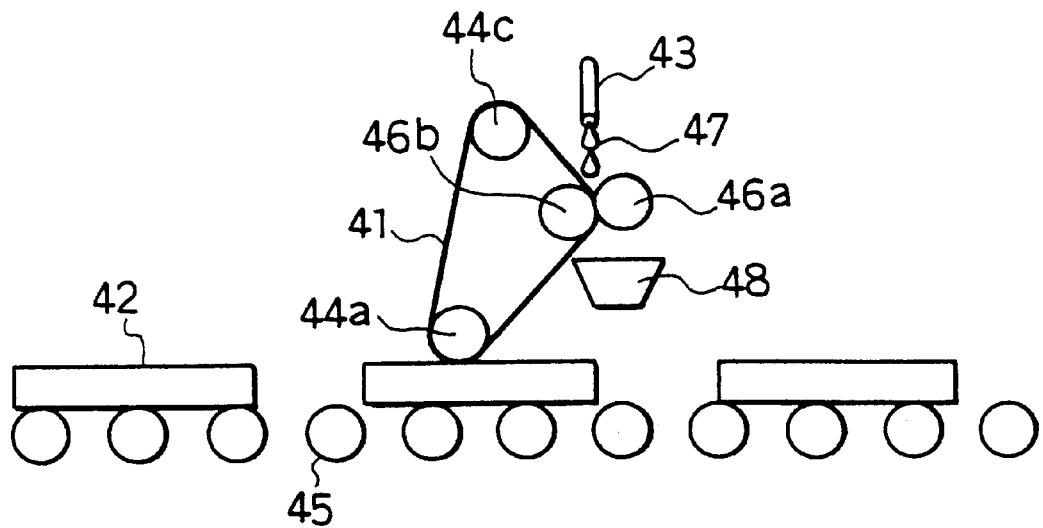
FIG. 4 is a perspective view schematically showing the arrangement of the coating apparatus in the fourth example of the present invention.

FIG. 4 shows a coating apparatus in the fourth example of the present invention.

A belt carrier 41 is supported on a number of rolls, i.e. a press roll 44a, and a guide roll 44c and a roll 46b. An article to be coated 42 is moved on conveying rolls 45. The carrier 41 is loaded with the coating solution which is dropped from a coating solution dropping nozzle 43 when passing between coating solution spreading rolls 46a and 46b. The reference number 47 indicates the coating solution being dropped and the number 48 indicates a coating solution receptor.

In Example 4, the same carrier and the same article as in Example 1 were used.

The coating solution was prepared by mixing cyclic dimethyl silicone (KF 994 available from Shin-Etsu Chemical Co., Ltd., Japan) with 1% of (tridecafluoro-1,1,2,2-tetrahydrooctyl) trichlorosilane (available from Chisso Corporation, Japan) as water repellent.

The coating solution thus prepared was loaded on the carrier 41 by dropping it on the contact area between the carrier 41 and the coating solution spreading roll 46a from the coating solution dropping nozzle 43. The carrier 41 was rotated and the coating was effected by rubbing the carrier against the glass as in Example 2.

The contact angle of the glass after the coating is shown in Table 1.

In the present example, the repellent used was (tridecafluoro-1,1,2,2-tetrahydrooctyl) trichlorosilane. The coating could be effected with identical results with (heptadecafluoro-1,1,2,2-tetrahydrodecyl) trichlorosilane, (henicosafluoro-1,1,2,2-tetrahydrodecyl) trichlorosilane, phenyl trichlorosilane and (heptadecafluoro-1,1,2,2-tetrahydrodecyl) triisocyanate silane.

EXAMPLE 5

Figure 5:
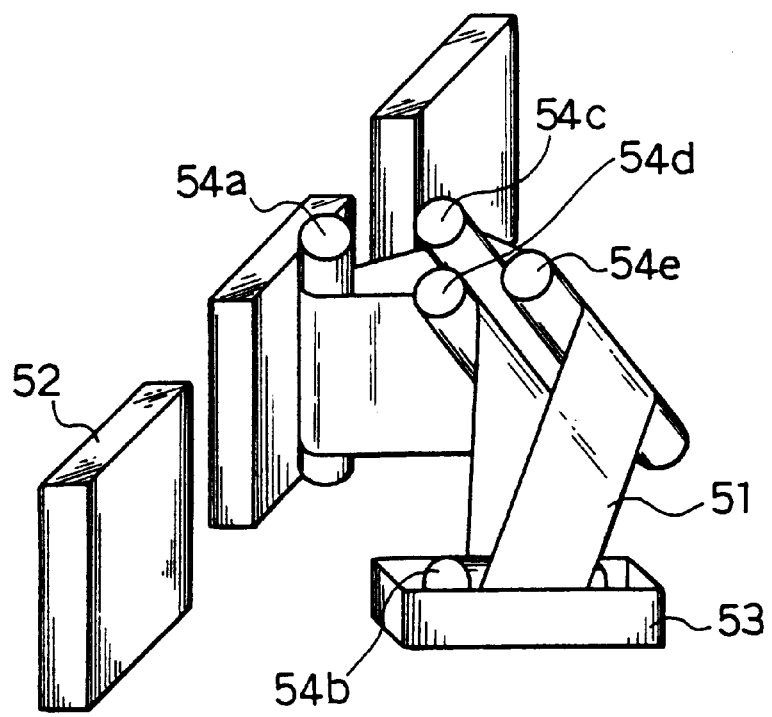
FIG. 5 is a perspective view schematically showing the arrangement of the coating apparatus in the fifth example of the present invention.

FIG. 5 shows a coating apparatus in the fifth example of the present invention.

An article to be coated 52 is moved with the coating surface held vertical by a conveying apparatus (not shown). The belt carrier 51 is supported on a number of rolls, i.e. a press roll 54a, a roll 54b within a coating solution vessel 53 and guide rolls 54c, 54d and 54e. And the carrier 51 is twisted by guide rolls 54c, 54d and 54e and pressed onto the article 52 by a press roll 54a installed vertical.

In Example 5, the same carrier, the same article and the same coating solution in Example 4 were used. The rotational speed of the carrier 51 was set at 5 m/minute while the conveying speed of the article was set at 4 m/minute.

After coating, the glass was heated at 100° C. for 10 minutes and washed with water.

The contact angle of the glass after the coating is shown in Table 1.

EXAMPLE 6

Figure 6:
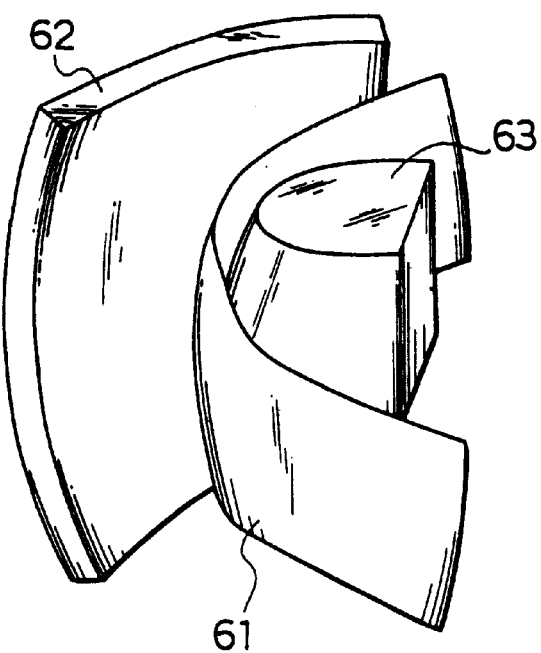
FIG. 6 is a perspective view showing the main part of the coating apparatus in the sixth example of the present invention.

FIG. 6 shows the contact area between a carrier and an article in the coating apparatus in the present example.

A belt carrier 61 is supported on a metal carrier press 63 and at least two guide rolls (not shown). The reference number 62 indicates an article to be coated with a curved coating surface. While the carrier 61 was pressed tightly onto the article 62 by the metal carrier press 63, the article 61 is held and moved, with the opposite side of the carrier from the metal carrier press 63 in contact with the coating surface.

In Example 6, the same carrier and the same coating solution in Example 4 were used. The other parts than the contact area between the carrier and the article were configured in the same way as in Example 5.

The article coated in Example 6 was a curved glass sheet. The metal carrier press 63 was formed in a convex shape so as to fit on the curved glass surface. This metal carrier press 63 can press the carrier against the glass surface.

Using the coating apparatus with that contact area, the concave coating surface of the glass sheet was coated in the same way as in Example 5.

The contact angle of the glass after the coating is shown in Table 1.

EXAMPLE 7

Figure 7:
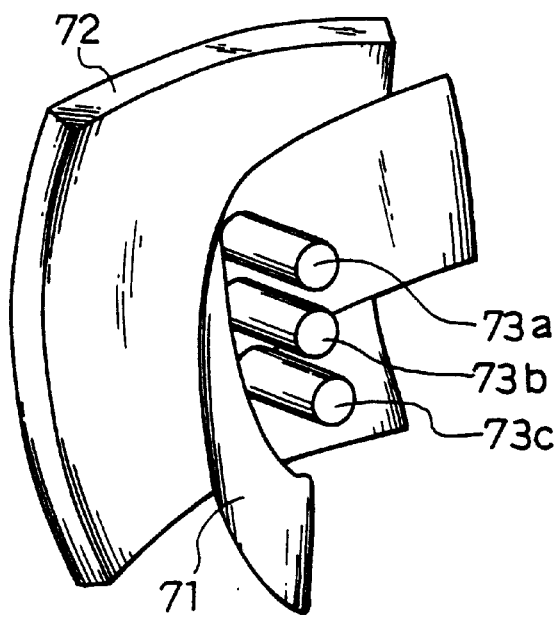
FIG. 7 is a perspective view showing the main part of the coating apparatus in the seventh example of the present invention.

FIG. 7 shows the contact area between a carrier and an article to be coated in the coating apparatus in the present example.

The reference number 71 indicates a belt carrier and the number 72 indicate the article. The configurations are the same as those in Example 6 except that independently movable metal carrier presses 73 are provided.

In Example 7, the same carrier and the same coating solution as those in Example 4 were used. The other parts than the contact area between the carrier and the article were configured in the same way as in Example 5.

The article in Example 7 was a curved glass sheet. The metal carrier presses were made of stainless steel in the form of cylinder of 5 cm in diameter and 10 cm in length with a rounded end which was in contact with the article. Three metal carrier presses of that configuration were disposed vertically one upon another at an interval of 2 cm. Those metal presses each work independently and press the carrier according to the curved coating surface of the glass.

Using the coating apparatus with that contact area, the concave coating surface of the glass sheet was coated in the same way as in Example 5.

The contact angle of the glass after the coating is shown in Table 1.

In Example 7, the concave coating surface of the glass sheet was coated. Glass sheets with a convex surface as well as a plain or even surface can be coated in the same way.

EXAMPLE 8

Figure 8:
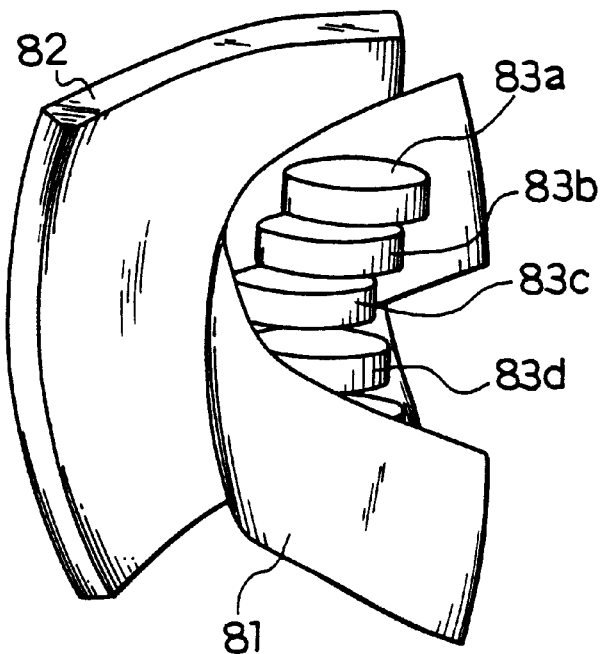
FIG. 8 is a perspective view showing the main part of the coating apparatus in the eighth example of the present invention.

FIG. 8 shows the contact area between a carrier and an article to be coated in the coating apparatus in the present example.

The reference number 81 indicates a carrier in the form of belt and the number 82 indicate the article. The configurations are the same as those in Example 6 except that independently movable metal carrier presses 83a, 83b, 83c and 83d are provided.

In Example 8, the same carrier and the same coating solution in Example 4 were used. The other parts than the contact area between the carrier and the article were configured in the same way as in Example 5.

The article coated in Example 8 was a curved glass sheet. The metal carrier presses were made in the form of disk-like ring of 3 cm in thickness, and seven rolls of that construction were disposed vertically one upon another at an interval of 1 cm. Those rolls each work independently and press the carrier according to the curved coating surface of the glass.

Using the coating apparatus with that contact area, the concave coating surface of the glass sheet was coated in the same way as in Example 5.

The contact angle of the glass after the coating is shown in Table 1.

In Example 8, the concave coating surface of the glass sheet was coated. Glass sheets with a convex surface as well as a plain or even surface can be coated in the same way.

EXAMPLE 9

Figure 9:
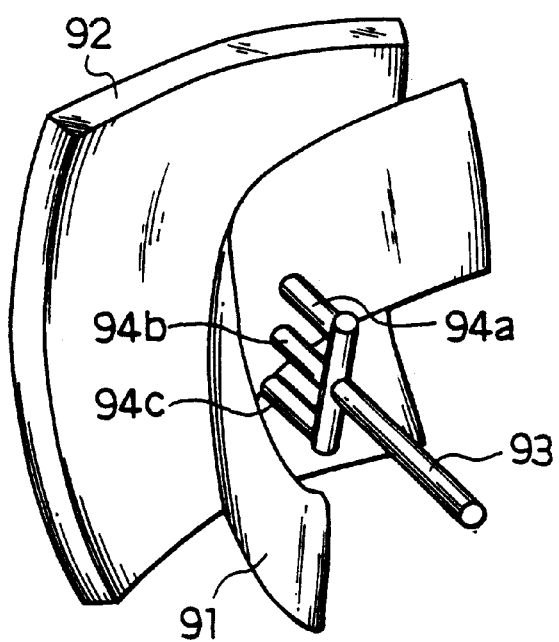
FIG. 9 is a perspective view showing the main part of the coating apparatus in the ninth example of the present invention.

FIG. 9 shows the contact area between a carrier and an article to be coated in the coating apparatus in the present example.

The reference number 91 indicates a carrier in the form of belt and the number 92 indicate the article. The configurations are the same as those in Example 6 except that the carrier 91 is pressed against the article by jetting high-pressure gas from a high-pressure gas feeding pipe 93 on to the carrier through plural nozzles 94a, 94b and 94c to pressure it against the article instead of the metal carrier presses in Example 6.

In Example 9, nitrogen gas under a pressure of 2 kgf/cm² was supplied through the high-pressure gas feeding pipe 93 and jetted through the nozzles 94. Therefore, the carrier could be pressed against the curved coating surface of the glass sheet. And the coating was carried out on the concave surface of the article in the same way as in Example 6.

The contact angle of the glass after the coating is shown in Table 1.

In Example 9, a concave surface of a glass sheet was coated. Glass sheets with a convex surface as well as a plain or even surface can be coated just the same way. The coating also can be effected just the same way using compressed air from a compressor in stead of nitrogen gas.

EXAMPLE 10

Figure 10:
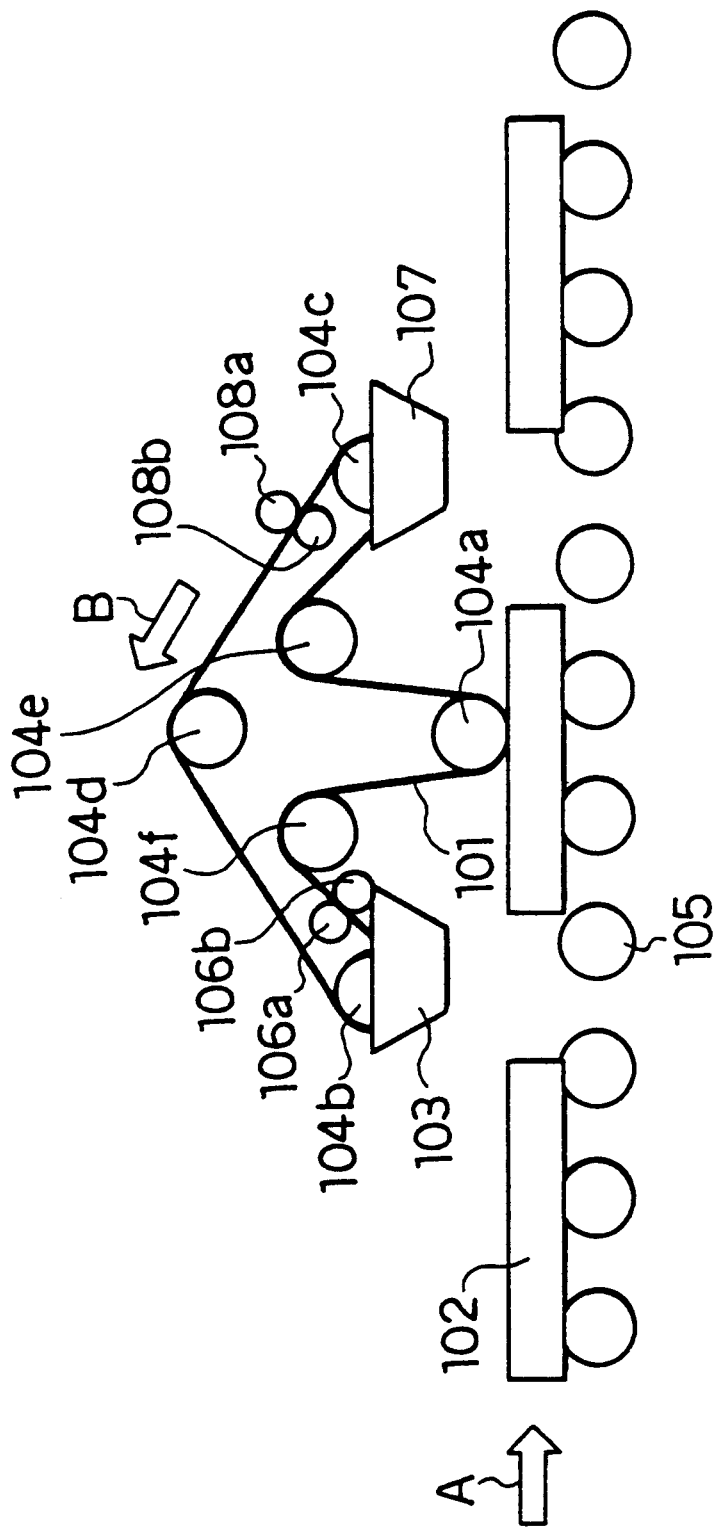
FIG. 10 is a perspective view schematically showing the arrangement of the coating apparatus in the tenth example of the present invention.

FIG. 10 shows a coating apparatus used in the present example.

The reference number 101 indicates a carrier in the form of belt. An article 102 is moved on conveying rolls 105 in the direction of arrow A. The belt carrier 101 is supported on a press roll 104a, a roll 104b provided within a coating solution vessel 103, a roll 104c provided within a washing fluid vessel 107 and guide rolls 104d, 104e and 104f. The reference numbers 106a and 106b indicate rolls to control the amount of the coating solution loaded on the carrier 101 in the coating solution vessel 103 by passing the carrier 101 therethrough. The reference numbers 108a and 108b indicate rolls between which the carrier 101 is passed to prevent an excessive amount of the washing fluid from remaining on the carrier.

In Example 10, the same carrier, the same article and the same coating solution as in Example 4 were used.

After the coating solution was filled into the coating solution vessel and cyclic dimethyl silicone (KF 994 available from Shin-Etsu Chemical Co., Ltd., Japan) was poured into the washing fluid vessel 107, the carrier 101 was rotated in the direction of arrow B. The carrier 101 was passed between coating solution controlling rolls 106a and 106b to squeeze out the excessive coating solution on the carrier 101. The carrier 101 was also passed between washing solution controlling rolls 108a and 108b to squeeze out the excessive washing fluid on the carrier 101.

As in Example 4, the article 102 was moved on the conveying rolls 105 in the direction of arrow A with the press roll 104a pressing the carrier against the glass sheet. Thus, the coating was effected with the carrier rubbing the glass sheet as in Example 2.

The contact angle of the glass after the coating is shown in Table 1.

In Example 10, since the coating solution was applied while the carrier was washed with the washing fluid, even stained coating surfaces with dust could be coated stably.

EXAMPLE 11

Figure 11:
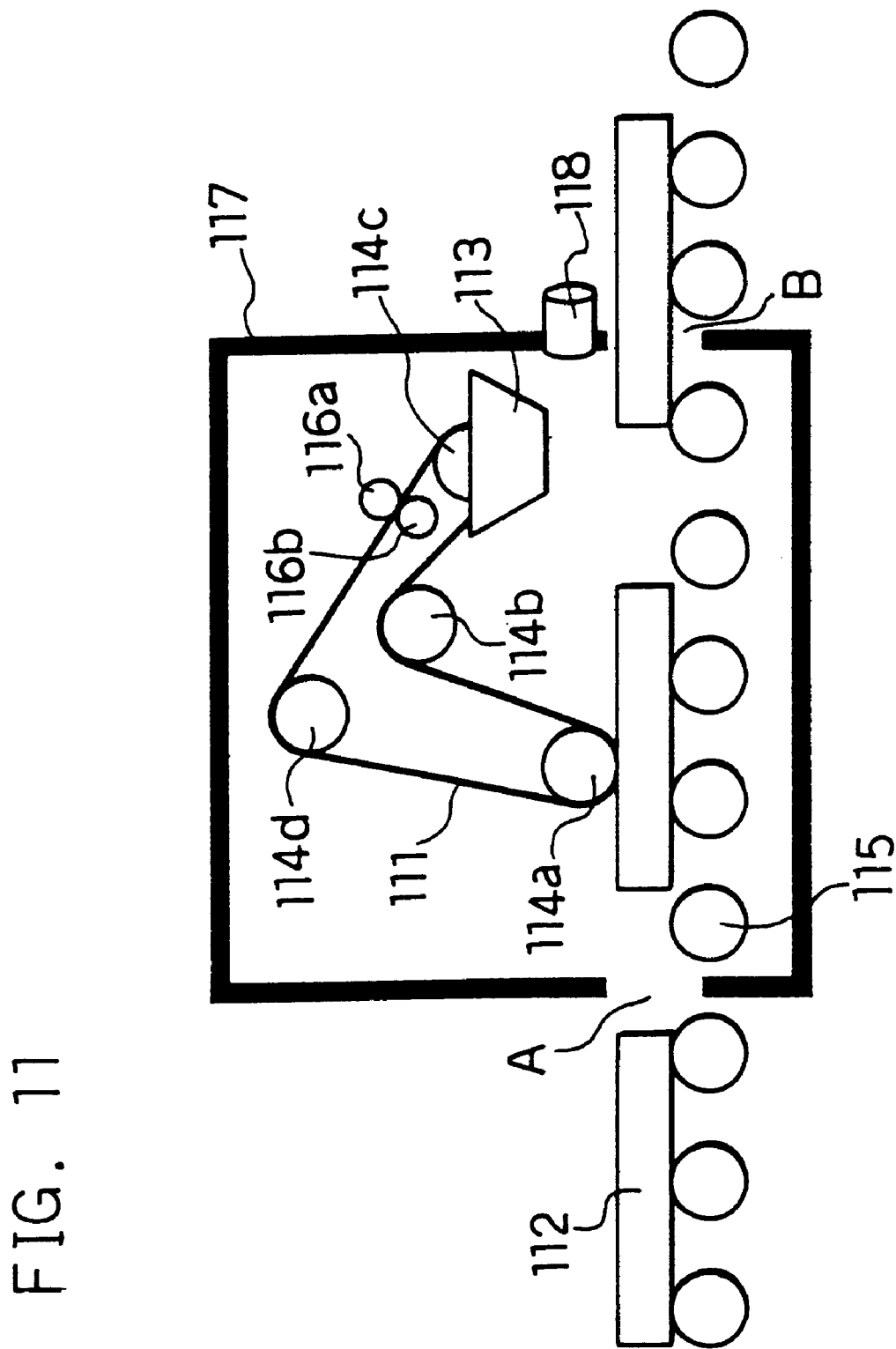
FIG. 11 is a perspective view schematically showing the arrangement of the coating apparatus in the eleventh example of the present invention.

FIG. 11 shows a coating apparatus in the present example.

In FIG. 11, the configurations are the same as those in Example 2 except that there are provided a housing 117, which shields a carrier 111 and a coating solution vessel 113 and a gas inlet port 118 through which a dried gas is led inside the housing. The same coating solution as in Example 4 was used.

Inside the housing 117, a dry nitrogen gas is led through the gas inlet port 118 at the rate of 10 liters/minute and let out through housing openings A and B.

The article 112 is moved on the conveying rolls 115 into the housing through the housing opening A on the left side in the drawing, coated by the carrier 111 and sent out through the housing opening B.

At that time, since the housing is so filled with dry nitrogen gas, no outside air came through the openings. Thus, the coating solution on the carrier 111 and in the vessel 113 are shielded from the outside air.

The contact angle of the glass after the coating is shown in Table 1.

Because the coating solution was protected against the outside air in Example 11, the coating could be continued stably for a long time with no degration of the coating solution.

EXAMPLE 12

The coating was carried out in the same way as in Example 8 except that the article to be coated was a earthenware dish of 20 cm in diameter. The concave side of the dish was coated.

The contact angle on the dish after the coating is shown in FIG. 1.

EXAMPLE 13

A copper plate was coated with a water repellent by using the same coating apparatus as in Example 1. The coating solution was prepared by mixing butanol with 3% of octadecyl mercaptan. The copper plate coated was 30 cm×30 cm in size and 2 mm in thickness.

The contact angles of the glass before and after the coating are shown in Table 1.

In the present example, octadecyl mercaptan was used. The coating could also be effected with identical results by using octyl mercaptan, dodecathiol, pentafluorophenyl mercaptan and 1,3,5-triazine-2,4,6-trithiol instead.

|  | Contact Angle (degree) | |
| --- | --- | --- |
|  | Before Coating | After coating |
| Example 1 | 20 | 98 |
| Example 2 | 20 | 100 |
| Example 3 | 20 | 85 |
| Example 4 | 20 | 112 |
| Example 5 | 20 | 110 |
| Example 6 | 20 | 108 |
| Example 7 | 20 | 106 |
| Example 8 | 20 | 109 |
| Example 9 | 20 | 106 |
| Example 10 | 20 | 111 |
| Example 11 | 20 | 111 |
| Example 12 | 15 | 110 |
| Example 13 | 55 | 99 |

An article comprising gold, silver or nickel could be coated with just the identical results.

Figure 12:
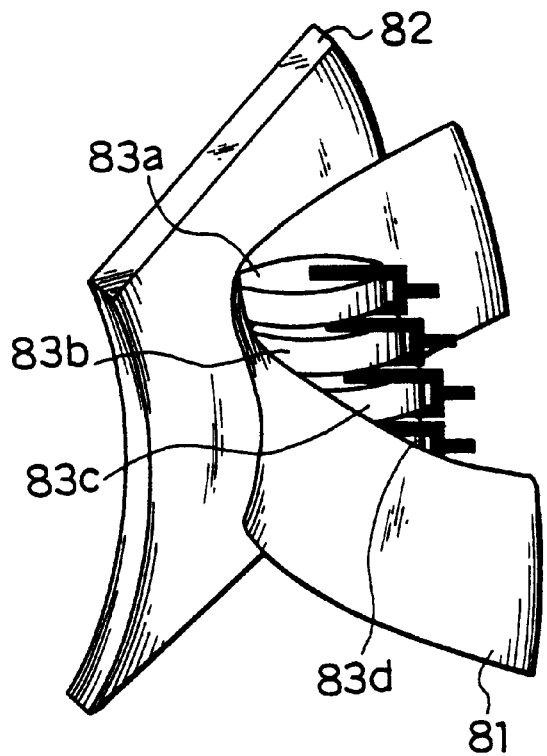
FIG. 12 is a perspective view showing the main part of the coating apparatus in one example of the present invention.
Figure 13:
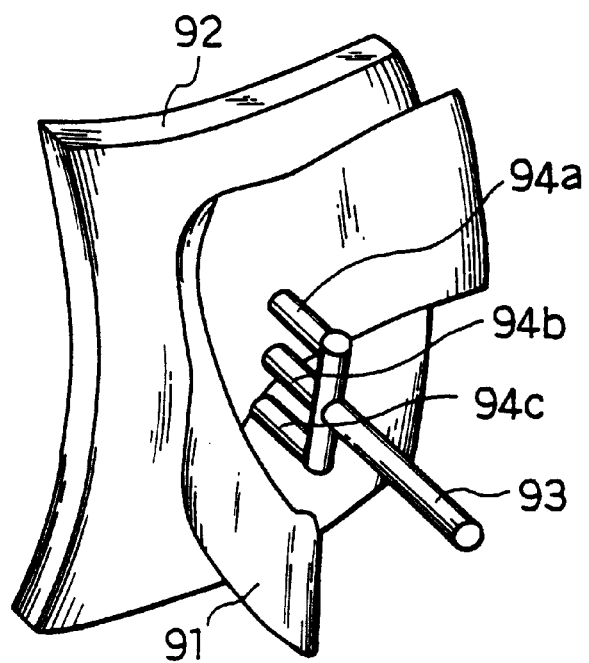
FIG. 13 is a perspective view showing the main part of the coating apparatus in one example of the present invention.

Also, when the convex surface of a curved glass sheet was coated as shown in FIG. 12 and FIG. 13 in the same way as in Example 8 and Example 9, an identical repellent coat could be obtained.

The present invention permits repellent coating on a specific surface with very high efficiency. The coating surface may be either plain or curved. The coating process according to the present invention is applicable to formation of a variety of coating films including water repellent, hydrophilic, protective and hard coating films.

What is claimed is:

1. A water repellent coating method comprising the steps of:
   (a) loading a carrier in the form of endless belt with a coating solution containing a water repellant,
   (b) bringing said carrier into contact with an article, the article having a curved surface such that the carrier conforms to the curved surface of the article at the point of contact with said curved surface, and
   (c) transferring the coating solution to the curved surface of the article to form a water repellent film on the curved surface.

2. The water repellent coating method in accordance with claim 1, which further includes step (d) of washing said carrier.

3. The water repellent coating method in accordance with claim 1, wherein the water repellent is a silane compound containing at least one group selected from the group consisting of an alkyl group, a fluoroalkyl group and an aryl group.

4. The water repellent coating method in accordance with claim 1, wherein the water repellent is a thiol compound containing at least one group selected from the group consisting of an alkyl group and an aryl group.

5. The water repellent coating method in accordance with claim 1, wherein the water repellent is a triazine thiol compound.

6. The water repellent coating method in accordance with claim 1, wherein the carrier is made of rubber, woven fabrics or nonwoven fabrics.

7. The water repellent coating method in accordance with claim 1, wherein the carrier and the article are moved at relatively different speeds to cause the carrier to rub on the curved surface of the article thereby transferring the coating solution onto the article.

8. The water repellent coating method in accordance with claim 1, wherein the coating solution is loaded on the carrier by dipping the carrier in the coating solution in step (a).

9. The water repellent coating method in accordance with claim 1, wherein the coating solution is loaded on the carrier by spraying the coating solution on the carrier in step (a).

10. The water repellent coating method in accordance with claim 1, wherein the coating solution is loaded on the carrier by dropping the coating solution on the contact area between the carrier and a pair of rolls brought into contact with the carrier in step (a).

11. The water repellent coating method in accordance with claim 8, wherein step (a) further includes passing the carrier between a plurality of rolls to control the amount of the coating solution loaded on the carrier after the coating solution is loaded on the carrier.

\* \* \* \* \*